US012749672B2

(12) United States Patent
Kim et al.

(10) Patent No.: US 12,749,672 B2
(45) Date of Patent: Sep. 29, 2026

(54) ELECTRODE ROLLING APPARATUS AND ELECTRODE ROLLING METHOD

(71) Applicant: LG Energy Solution, Ltd., Seoul (KR)

(72) Inventors: Hwan Han Kim, Daejeon (KR); Jeong Soo Seol, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 728 days.

(21) Appl. No.: 18/024,881

(22) PCT Filed: Nov. 4, 2021

(86) PCT No.: PCT/KR2021/015946
§ 371 (c)(1),
(2) Date: Mar. 6, 2023

(87) PCT Pub. No.: WO2022/145687
PCT Pub. Date: Jul. 7, 2022

(65) Prior Publication Data

US 2023/0361265 A1 Nov. 9, 2023

(30) Foreign Application Priority Data

Jan. 4, 2021 (KR) ........................ 10-2021-0000262

(51) Int. Cl.
*B30B 3/04* (2006.01)
*B30B 15/14* (2006.01)
*B30B 15/34* (2006.01)
*H01M 4/04* (2006.01)

(52) U.S. Cl.
CPC ............. *H01M 4/0435* (2013.01); *B30B 3/04* (2013.01); *B30B 15/14* (2013.01); *B30B 15/34* (2013.01)

(58) Field of Classification Search
CPC .. B30B 3/00; B30B 3/04; B30B 15/14; B30B 15/34; H01M 4/0435; H01M 4/04; Y02E 60/10; Y02P 70/50
See application file for complete search history.

(56) References Cited

U.S. PATENT DOCUMENTS 4,081,229 A * 3/1978 Moore .................... B30B 11/16 427/367
2011/0005285 A1 1/2011 Otsuka et al.
2013/0234543 A1* 9/2013 Buttner ................. B60L 3/0061 310/54

FOREIGN PATENT DOCUMENTS

CN 210023689 U * 2/2020 ........... B22D 11/128
JP H0584505 A 4/1993
JP 2655991 B2 9/1997
JP 2002296951 A * 10/2002
JP 2009255097 A * 11/2009
JP 2011181348 A 9/2011
(Continued)

OTHER PUBLICATIONS

English translation of JP 2011181348 A—11 pages—retrieved in Oct. 2025 (Year: 2025).*
(Continued)

*Primary Examiner* — Jimmy T Nguyen
(74) *Attorney, Agent, or Firm* — Lerner David LLP

(57) ABSTRACT

An electrode rolling apparatus includes a rolling roll that rolls an electrode substrate, and a rolling roll cooling unit that supplies a cooling medium to the inside of a rolling roll to cool the rolling roll, wherein the cooling medium transferred through the rolling roll cooling unit flows through the outer portion of the rolling roll.

4 Claims, 3 Drawing Sheets

(56) References Cited

FOREIGN PATENT DOCUMENTS

| | | | | | |
|---|---|---|---|---|---|
| JP | 2013086111 | A | | 5/2013 | |
| JP | 5428173 | B2 | | 2/2014 | |
| JP | 2015157294 | A | | 9/2015 | |
| JP | 2020071919 | A | | 5/2020 | |
| JP | 2020133847 | A | | 8/2020 | |
| JP | 2021126608 | A | * | 9/2021 | |
| KR | 20090038807 | A | | 4/2009 | |
| KR | 101299374 | B1 | | 8/2013 | |
| KR | 20160126670 | A | | 11/2016 | |
| WO | WO-2016030929 | A1 | * | 3/2016 | ................ F28F 5/02 |

OTHER PUBLICATIONS

English translation of WO 2016030929 A1—7 pages—retrieved in Oct. 2025 (Year: 2025).*
English translation of CN 210023689 U—11 pages—retrieved in Oct. 2025 (Year: 2025).*
Machine english translation for JP-2002296951A—14 pages (Year: 2026).*
Machine english translation for JP-2009255097A—6 pages (Year: 2026).*
International Search Report for PCT/KR2021/015946 mailed Mar. 4, 2022. 4 pages.

* cited by examiner

【FIG. 1】
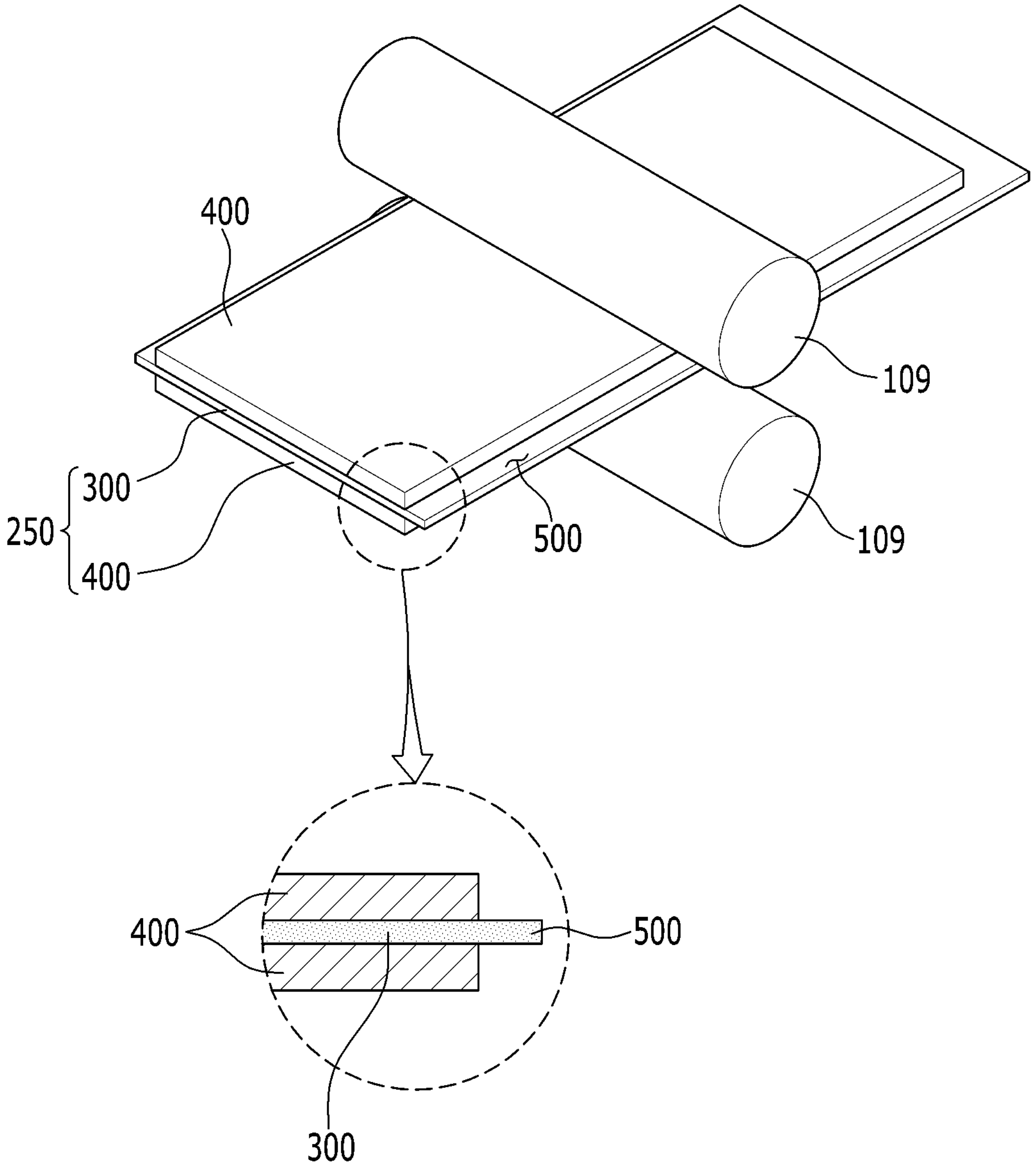

【FIG. 2】
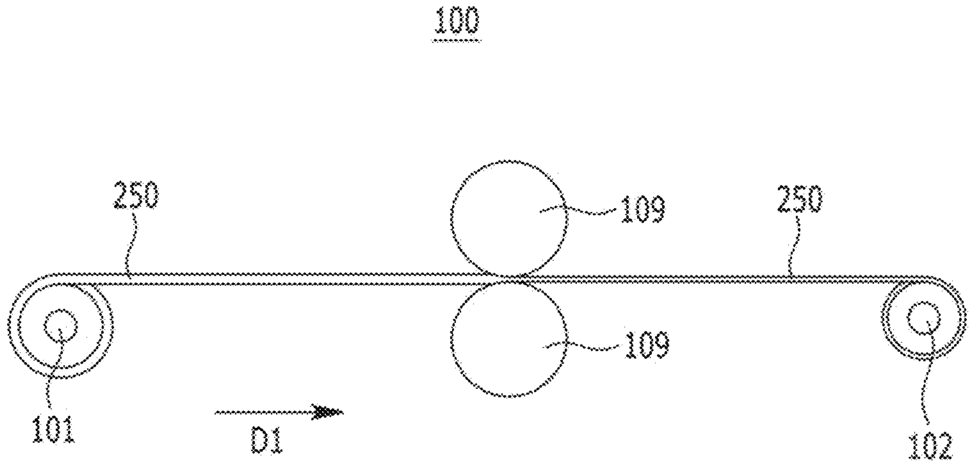
【FIG. 3】
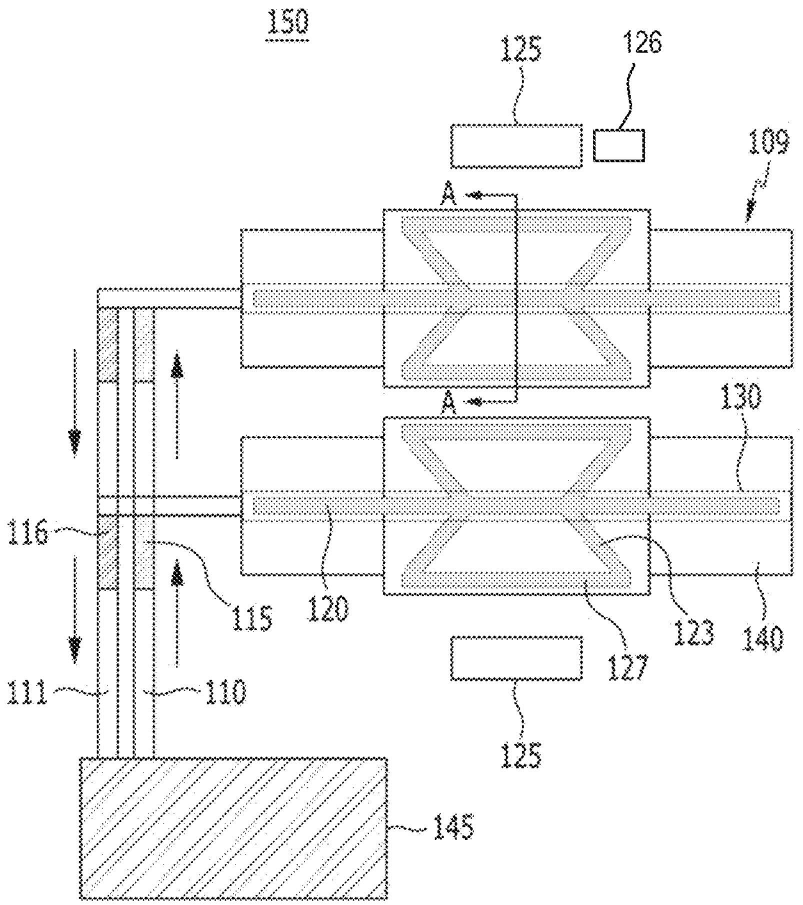

【FIG. 4】
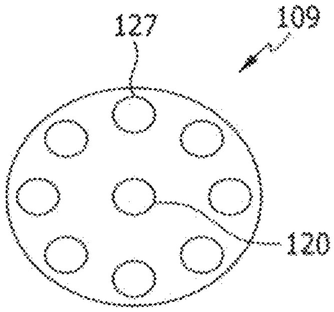
【FIG. 5】
(PRIOR ART)
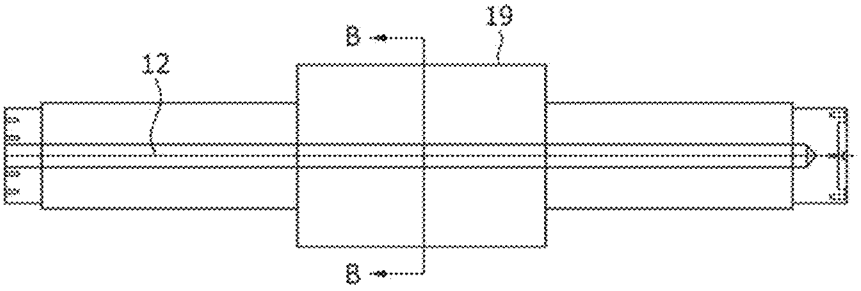
【FIG. 6】
(PRIOR ART)
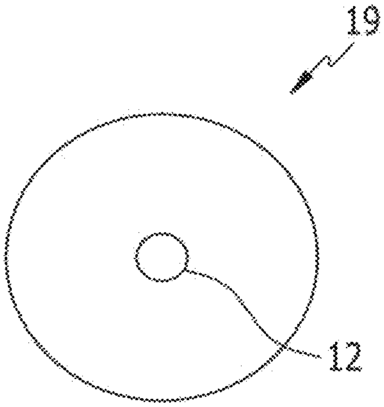

ELECTRODE ROLLING APPARATUS AND ELECTRODE ROLLING METHOD

TECHNICAL FIELD

This application is a national phase entry under 35 U.S.C. § 371 of PCT/KR2021/015946, filed on Nov. 4, 2021, and claims the benefit of Korean Patent Application No. 10-2021-0000262 filed on Jan. 4, 2021 with the Korean Intellectual Property Office, the disclosures of which are incorporated herein by reference in their entireties.

TECHNICAL FIELD

The present disclosure relates to an electrode rolling apparatus and an electrode rolling method, and more particularly, to an electrode rolling apparatus and an electrode rolling method having improved rolling processability.

BACKGROUND

In line with increasing technological development and demand relating to mobile devices, demand for secondary batteries has also been rapidly increased. Among the secondary batteries, lithium secondary batteries having high energy density and operating voltage and excellent preservation and lifetime characteristics have been widely used as energy sources of various electronic products as well as various mobile devices.

The secondary battery can be formed by inserting an electrode assembly composed of a positive electrode plate, a negative electrode plate, and a separator into a case, and then sealing the case. A positive electrode plate or a negative electrode plate (hereinafter, referred to as "electrode substrate") can be configured by coating an active material slurry onto a positive conductive current collector or a negative conductive current collector to a predetermined thickness, interposing a separator between the positive electrode conductive current collector and the negative electrode conductive current collector, and winding the plate in a jelly-roll type many times or laminating it in a plurality of layers to form an electrode assembly.

The electrode substrate may be formed of an active material-coated portion coated with an active material slurry and an uncoated portion not coated with an active material slurry. The active material-coated portion can include a roll process that increases the adhesiveness to the electrode current collector and increases the volume density of the active material. The rolled electrode plate can be used by passing through a cutter having a certain width after drying and cutting into a predetermined size.

In the step of the rolling process of the electrode substrate, the progress speed of the rolling process is increased in order to improve productivity. As the rolling speed increases, heat generation due to the driving of the bearing part and frictional heat generation between the electrode substrate and the rolling roll may occur. At this time, the thickness in the axial direction of the rolling roll of the rolled electrode substrate may not be uniform, and the thickness distribution may be large. Therefore, the rolling processability of the electrode may be deteriorated.

DETAILED DESCRIPTION OF THE INVENTION

Technical Problem

It is an object of the present disclosure to provide an electrode rolling apparatus and an electrode rolling method having improved rolling processability.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided an electrode rolling apparatus comprising: a rolling roll that rolls an electrode substrate, and a rolling roll cooling unit that supplies a cooling medium to the inside of a rolling roll to cool the rolling roll, wherein the cooling medium transferred through the rolling roll cooling unit flows through the outer portion of the rolling roll.

The rolling roll cooling unit may comprise an inlet and an outlet that are disposed outside the rolling roll to provide a flow path of the cooling medium, and a refrigerant pipe that communicates with the inlet and the outlet and passes through a central part of the rolling roll.

An inner pipe through which the cooling medium flows may be formed at the outer portion of the rolling roll, and the inner pipe is connected to the refrigerant pipe.

The inner pipe may be formed by a plurality of numbers along the outer portion of the rolling roll.

The electrode rolling apparatus may further comprise an inlet temperature measuring unit and an outlet temperature measuring unit that measure the temperature of the cooling medium passing through the inlet and the outlet, respectively.

The electrode rolling apparatus may further comprise a rolling roll temperature measuring unit that is located adjacent to the surface of the rolling roll.

The electrode rolling apparatus may further comprise a cooling medium flow rate control unit that controls the flow rate of the cooling medium so that the surface temperature of the rolling roll measured through the rolling roll temperature measuring unit is maintained within a preset distribution range.

According to another embodiment of the present disclosure, there is provided an electrode rolling method that rolls an electrode substrate including an electrode current collector layer and a coating part formed on one or both surfaces of the electrode current collector layer using a rolling roll, the method comprising the steps of: cooling the outer portion of the rolling roll, measuring the surface temperature of the rolling roll, and controlling the flow rate of a cooling medium flowing through the outer portion of the rolling roll in order to maintain the surface temperature of the rolling roll within a preset distribution range.

The step of measuring the surface temperature of the rolling roll may use a rolling roll temperature measuring unit located adjacent to the surface of the rolling roll.

The step of cooling the outer portion of the rolling roll may allow a cooling medium to flow through an inner pipe formed in the outer portion of the rolling roll.

The cooling medium flowing through the inner pipe may be supplied from a refrigerant pipe passing through the center part of the rolling roll.

The electrode rolling method may further comprise controlling the temperature of the cooling medium passing through the inlet and outlet of the refrigerant pipe, respectively, in order to maintain the surface temperature of the rolling roll within a preset distribution range.

Advantageous Effects

According to embodiments of the present disclosure, the cooling efficiency of the rolling roll can be increased by flowing the cooling medium on the surface of the rolling roll, and the rolling processability can be improved by managing the thickness profile of the rolled electrode.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view showing an electrode rolling apparatus according to an embodiment of the present disclosure;

FIG. 2 is a view schematically showing a state in which the rolling apparatus of FIG. 1 is viewed from the side surface;

FIG. 3 is a view schematically showing a cooling system including a rolling roll according to the present embodiment;

FIG. 4 is a cross-sectional view taken along a cross-section A-A of FIG. 3;

FIG. 5 is a view schematically showing a cooling system including a rolling roll according to a comparative example; and FIG. 6 is a cross-sectional view taken along a cross-section B-B of FIG. 5.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 1 is a perspective view showing an electrode rolling apparatus according to an embodiment of the present disclosure. FIG. 2 is a view schematically showing a state in which the rolling apparatus of FIG. 1 is viewed from the side surface.

Referring to FIG. 1, an electrode rolling method according to one embodiment of the present disclosure includes the steps of: coating an active material onto one or both surfaces of an electrode current collector layer 300 to form a coated portion 400 and an uncoated portion 500, and rolling the electrode substrate 250 including the coated portion 400 and the uncoated portion 500 formed on one or both surfaces of the electrode current collector layer 300.

Referring to FIGS. 1 and 2, the electrode rolling apparatus 100 according to the present embodiment includes a first roller 101 which unwinds an electrode substrate 250 having a coated portion 400 in which a coating material is formed on the electrode current collector layer 300 and an uncoated portion 500 corresponding to a plain portion, a second roller 102 which winds the electrode substrate 250, and a rolling roll 109 which is located between the first roller 101 and the second roller 102 and rolls the coated portion 400 and the uncoated portion 500 of the electrode substrate 250 along the moving direction of the electrode substrate 250. The uncoated portion 500 may refer to a region excluding the coated portion 400 formed on the electrode current collector layer 300.

The first roller 101 provides the electrode substrate 250 to be rolled to the rolling apparatus 100, and moves the electrode substrate 250 in a direction of arrow D1 of FIG. 2 in accordance with the clockwise rotation. The electrode substrate 250 unwound by the first roller 101 passes between the rolling rolls 109 while moving along the direction of the arrow. The rolling rolls 109 are located respectively on both sides with respect to the electrode substrate 250, and the electrode substrate 250 that has passed between the two rolling rolls 109 is pressed. After that, the electrode substrate 250 that has passed between the two rolling rolls 109 is rewound on the second roller 102.

It is possible to accelerate the progress speed of the rolling process in order to increase the productivity of the rolling process. When the rolling process speed increases, heat generation occurs by driving of the bearing for rotating the rolling roll 109, and heat generation may also occur even by a friction between the electrode substrate 250 and the rolling roll 109. When heat is generated in the rolling roll 109, the yield of the rolling process decreases as the thickness distribution of the electrode substrate 250 by the rolling process increases.

FIG. 3 is a view schematically showing a cooling system including a rolling roll according to the present embodiment. FIG. 4 is a cross-sectional view taken along a cross-section A-A of FIG. 3.

Referring to FIGS. 3 and 4, the electrode rolling apparatus according to the present embodiment includes a rolling roll cooling unit 150 that supplies a cooling medium to the inside of a rolling roll 109 to cool the rolling roll 109, wherein the cooling medium transferred through the rolling roll cooling unit 150 flows through the outer portion of the rolling roll 109. The rolling roll cooling unit 150 according to the present embodiment includes an inlet 110 and an outlet 111 that are disposed outside the rolling roll 109 to provide a flow path of the cooling medium, and may include a refrigerant pipe 120 that allows a cooling medium entering through the inlet 110 to pass through the center part of the rolling roll 109. The outlet 111 may be a portion where the cooling medium that has passed through the center part of the rolling roll 109 circulates and exits. The refrigerant pipe 120 may communicate with the inlet 110 and the outlet 111.

The rolling rolls 109 may be respectively disposed vertically with respect to the travelling electrode substrate 250 as shown in FIG. 2.

The electrode rolling apparatus according to the present embodiment may include a bearing unit 140 connected to the left and right sides of the rolling roll 109, and a shaft 130 passing through the bearing unit 140 and the center part of the rolling roll 109. The bearing unit 140 can transmit a rotational force to the rolling roll 109 by rotating the shaft 130. The refrigerant pipe 120 according to the present embodiment may be located within the shaft 130 or may be located adjacent to the shaft 130.

The rolling roll cooling unit 150 according to the present embodiment may further include an inlet temperature measuring unit 115 and an outlet temperature measuring unit 116 that measure the temperature of the cooling medium passing through the inlet 110 and the outlet 111, respectively.

The rolling roll cooling unit 150 further includes an inner pipe 127 that allows the cooling medium to flow through the outer portion of the rolling roll 109, and the inner pipe 127 may be formed by perforating the inside of the rolling roll 109. The inner pipe 127 according to the present embodiment may be connected to the refrigerant pipe 120 through the connection pipe 123 to receive supply of the cooling medium. The cooling medium may be cooling oil or cooling water.

The inner pipe 127 according to the present embodiment may be formed by a plurality of numbers along the outer portion of the rolling roll 109 as shown in FIG. 4. Here, the outer portion of the rolling roll 109 may refer to the surface portion of the rolling roll 109 appearing on a cross-section cut in a plane perpendicular to the moving direction of the electrode substrate 250 corresponding to the arrow direction D1 of FIG. 2.

The rolling roll cooling unit 150 may further include a rolling roll temperature measuring unit 125 located adjacent to the surface of the rolling roll 109. The surface temperature of the rolling roll 109 can be maintained within a preset distribution range through the rolling roll temperature measuring unit 125. The rolling roll temperature measuring unit 125 preferably uses a non-contact temperature sensor. At this time, since the emissivity of the rolling roll 109 may change depending on the surface, it is necessary to compensate for the changing emissivity to perform the non-contact temperature measurement. According to the present embodiment, an emissivity amplifier 126 can be used together with the non-contact temperature sensor.

Specifically, the rolling roll cooling unit 150 may further include a cooling medium flow rate control unit 145, and the cooling medium flow control unit 145 may control the flow rate of the cooling medium so that the surface temperature of the rolling roll 109 measured by the rolling roll temperature measuring unit 125 may be maintained within a preset distribution range. In addition, the cooling medium flow control unit 145 may control the temperatures of the inlet 110 and the outlet 111 measured by the inlet temperature measuring unit 115 and the outlet temperature measuring unit 116 so that the surface temperature of the rolling roll 109 becomes an appropriate temperature.

FIG. 5 is a view schematically showing a cooling system including a rolling roll according to a comparative example. FIG. 6 is a cross-sectional view taken along a cross-section B-B of FIG. 5.

Referring to FIGS. 5 and 6, the rolling roll cooling system according to a comparative example forms a refrigerant pipe 12 passing only the center part of the rolling roll 19, whereby the rolling thickness distribution due to the heat generation of the rolling roll 19 can be reduced to some degree. However, the amount of heat generated by the friction of rolling roll depending on low speed and high speed is different, and thus the rolling thickness fluctuates greatly depending on the moving speed. Specifically, when the rolling process is performed at a low speed, the cooling capacity is excessive and the rolling roll 19 is thermally contracted to increase the center value of the rolling thickness. When the rolling process is performed at a high speed, the rolling roll 19 is thermally expanded due to insufficient cooling capacity, so that the center value of the rolling thickness may decrease.

In contrast, according to the electrode rolling apparatus and the electrode rolling method according to the present embodiment described above, it is possible to control the surface temperature of the rolling roll so that the surface temperature of the rolling roll is maintained within a preset distribution range.

Next, a method of rolling an electrode using the electrode rolling apparatus according to the present embodiment described above will be briefly described.

Referring to FIGS. 1 to 4, the electrode rolling method according to the present embodiment includes the steps of: cooling the outer part of the rolling roll 109, measuring the temperature of the rolling roll 109, and controlling the flow rate of a cooling medium flowing through the outer portion of the rolling roll 109 in order to maintain the surface temperature of the rolling roll 109 within a preset distribution range.

The step of measuring the surface temperature of the rolling roll 109 may use a rolling roll temperature measuring unit 125 located adjacent to the surface of the rolling roll 109. The step of cooling the outer portion of the rolling roll 109 may allow a cooling medium to flow through an inner pipe 127 formed in the outer portion of the rolling roll 109. The cooling medium flowing through the inner pipe 127 may be supplied from a refrigerant pipe 120 passing through the center part of the rolling roll 109. The electrode rolling method may further comprise the step of controlling the temperature of the cooling medium passing through the inlet 110 and outlet 111 of the refrigerant pipe 120, respectively, in order to maintain the surface temperature of the rolling roll 109 within a preset distribution range.

Although preferred embodiments of the present disclosure have been shown and described above, the scope of the present disclosure is not limited thereto, and numerous other variations and modifications made by those skilled in the art using the basic principles of the invention defined in the appended claims also fall within the spirit and scope of the invention.

DESCRIPTION OF REFERENCE NUMERALS

109: rolling roll
115: inlet temperature measuring unit
116: outlet temperature measuring unit
120: refrigerant pipe
123: connection pipe
125: rolling roll temperature measuring unit
127: inner pipe
145: cooling medium flow rate control unit
150: rolling roll cooling unit

The invention claimed is:

1. An electrode rolling apparatus comprising:

a rolling roll that rolls an electrode substrate, a rolling roll cooling unit that supplies a cooling medium to an inside of the rolling roll to cool the rolling roll, a contact-less rolling roll temperature measuring unit located outside and adjacent to an exterior surface of the rolling roll, an emissivity amplifier configured to compensate for changing emissivity of the exterior surface of the rolling roll, and a cooling medium flow rate control unit configured to control a flow rate of the cooling medium so that a surface temperature of the rolling roll measured through the rolling roll temperature measuring unit is maintained within a preset distribution range, wherein the cooling medium transferred through the rolling roll cooling unit flows through an outer portion of the rolling roll, wherein the rolling roll cooling unit comprises:

an inlet and an outlet disposed outside the rolling roll to provide a flow path of the cooling medium;

a refrigerant pipe communicating with the inlet and the outlet and passing through a central part of the rolling roll;

a plurality of inner pipes formed by perforating the inside of the rolling roll along the outer portion of the rolling roll, through which the cooling medium flows; and a connection pipe connecting the refrigerant pipe and the plurality of inner pipes.

2. The electrode rolling apparatus according to claim 1, further comprising an inlet temperature measuring unit and an outlet temperature measuring unit that measure temperature of the cooling medium passing through the inlet and the outlet, respectively.

3. An electrode rolling method that rolls an electrode substrate including an electrode current collector layer and a coating part formed on one or both surfaces of the electrode current collector layer using a rolling roll, the method comprising the steps of:

cooling an outer portion of the rolling roll, measuring a surface temperature of the rolling roll using a contact-less rolling roll temperature measuring unit located outside and adjacent to an exterior surface of the rolling roll while compensating for changing emissivity of the exterior surface of the rolling roll using an emissivity amplifier, and controlling a flow rate of a cooling medium flowing through the outer portion of the rolling roll to maintain the surface temperature of the rolling roll within a preset distribution range, wherein the step of cooling the outer portion of the rolling roll includes allowing the cooling medium to flow through a plurality of inner pipes formed by perforating the inside of the rolling roll along the outer portion of the rolling roll, and wherein the cooling medium flowing through the plurality of inner pipes is supplied from a refrigerant pipe passing through a center part of the rolling roll through a connection pipe connecting the refrigerant pipe and the plurality of inner pipes.

4. The electrode rolling method according to claim 3, further comprising controlling temperature of the cooling medium passing through an inlet and an outlet of the refrigerant pipe, respectively, to maintain the surface temperature of the rolling roll within a preset distribution range.

* * * * *